Aug. 19, 1952     J. G. FLEMING     2,607,223
APPARATUS FOR MEASURING RATE OF FLUID FLOW
Filed Aug. 28, 1947     2 SHEETS—SHEET 1
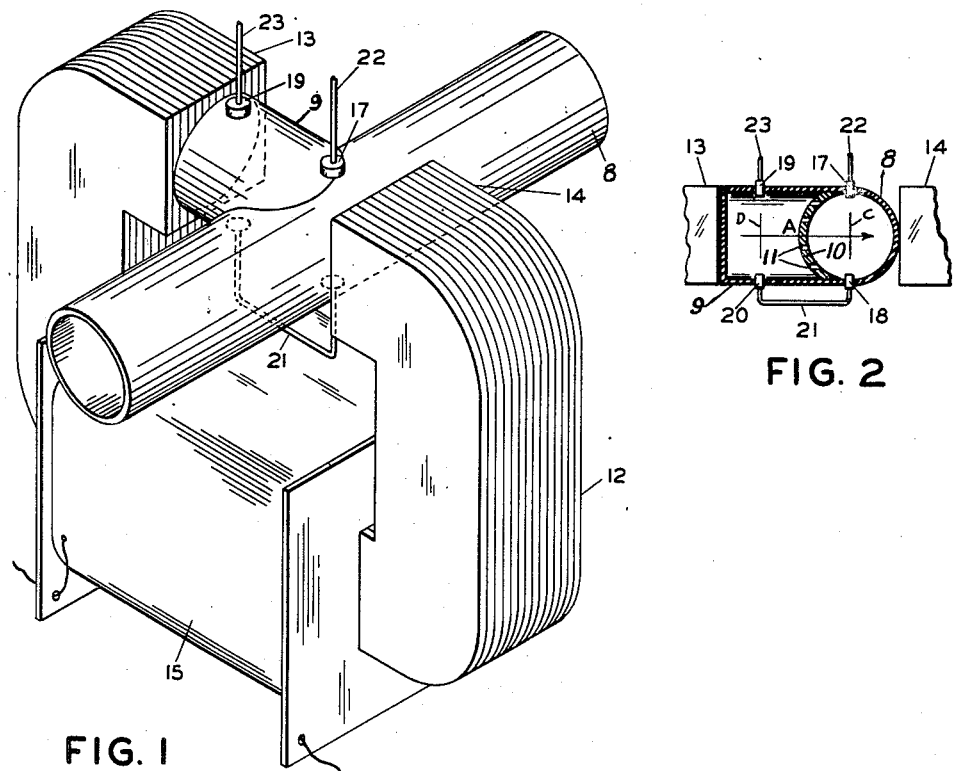
FIG. 1
FIG. 2
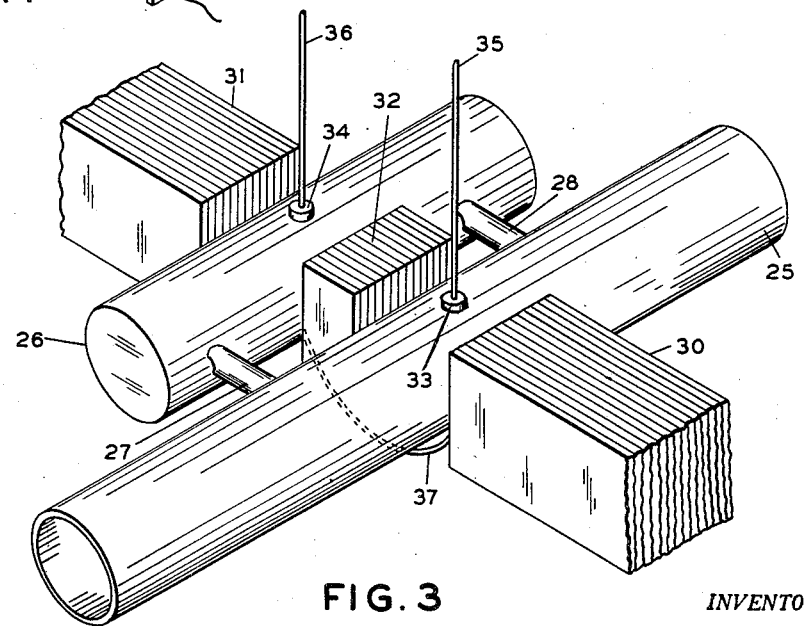
FIG. 3
INVENTOR.
JOHN G. FLEMING
BY
*E. C. Sanborn*
ATTORNEY

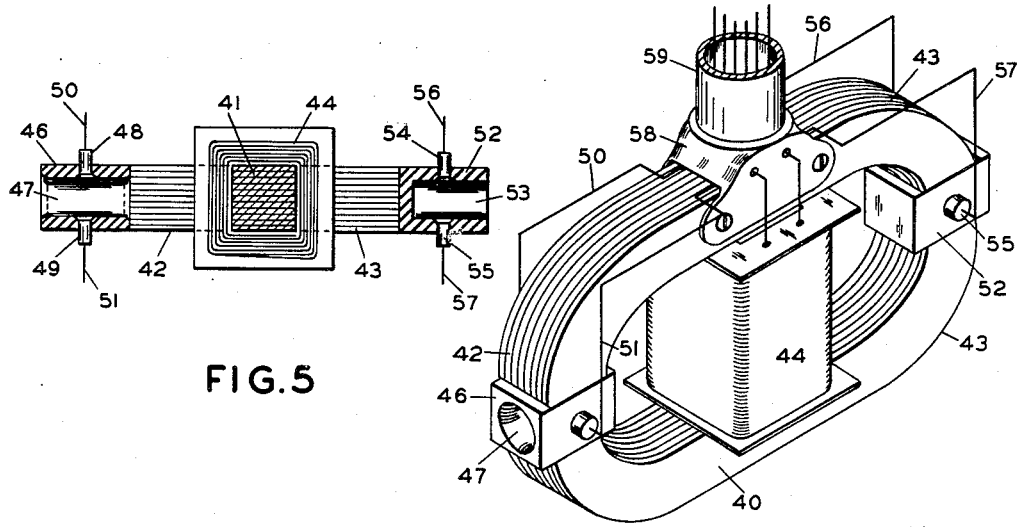
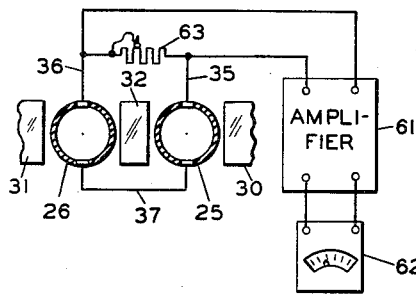
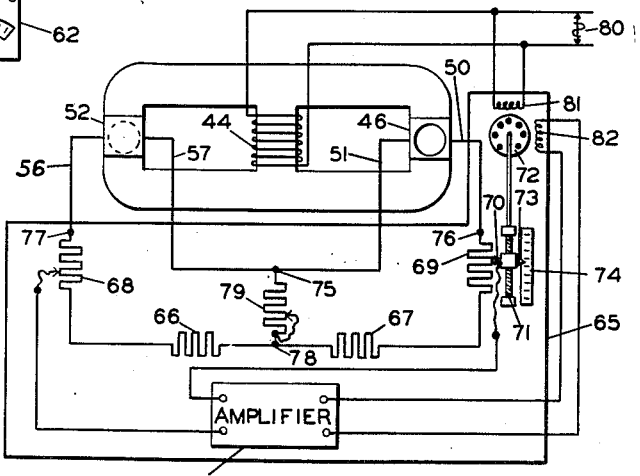
INVENTOR.
JOHN G. FLEMING
BY
E. C. Sanborn
ATTORNEY Patented Aug. 19, 1952

2,607,223

UNITED STATES PATENT OFFICE 2,607,223

APPARATUS FOR MEASURING RATE OF FLUID FLOW

John G. Fleming, Woodbury, Conn., assignor to The Bristol Company, Waterbury, Conn., a corporation of Connecticut Application August 28, 1947, Serial No. 771,118

13 Claims. (Cl. 73—194)

This invention relates to the determination of fluid flow by electrical means, and more especially to the measurement of the rate of flow of a conducting or semi-conducting liquid on the basis of electromotive force set up in a moving body of said liquid by virtue of its passage through a magnetic field. The phenomenon of electrical potential differences developed in fluids moving through magnetic fields has been the basis of more or less disconnected studies extending over the past century, and was reported in considerable detail by Michael Faraday in one of the Bakerian Lectures and in vol. I of his published work Experimental Researches in Electricity, dated 1849. The subject is also discussed by E. J. Williams in the Proceedings of the Physical Society of London, vol. 42 (1930). The most advanced state of the prior art in the attempted utilization of this principle for practical purposes is exemplified in U. S. Patent 2,149,847 granted to A. Kolin March 7, 1939, wherein the fluid whose velocity is to be measured is caused to pass through a conduit positioned in a homogeneous unidirectional magnetic field across its entire sectional area, said conduit being provided with electrodes communicating electrically with the fluid and externally connected in a measuring circuit.

Development of an electrical potential gradient due to the generation of an electric field by electromagnetic induction presupposes that the medium wherein the electric field is generated is a conductor of electricity. The electrical conductivity of water solutions (electrolytes) is provided by the presence of dissociation of dissolved salts, acids, or bases, or, in the case of pure distilled water, by the H+ and OH− ions directly. Where ionization and unidirectional ionic flow occur in a medium, there will result an accumulation of electrically unstable ion clouds at the electrodes. This phenomenon is commonly known as "polarization." The instability of the ion clouds leads to variable electrolyte currents whose presence preclude the use of direct current for precise practical measurement in circuits wherein aqueous solutions are involved. As is well known from practice in measuring the electrical resistivity of liquids, the use of alternating currents and voltages in such measurements enables the effects of polarization to be minimized to an extent that the alternating magnitudes may be accurately measured without objectionable interference. It has been found that the frequency of alternating current necessary to eliminate objectionable polarization effects depends upon the resistivity of the electrolyte, and that, while relatively high frequencies may be necessary when working with solutions having low inherent resistivity, "power" frequencies, of the order of 60 cycles per second are suitable where high resistivities are involved.

When an electrical conductor is positioned in an alternating magnetic field, there is set up in its mass by electromagnetic induction an alternating electromotive force having a frequency corresponding to that of the field, and an intensity which is a function of both the magnitude and the frequency of the field, and a phase characteristic in time-quadrature with the field. This electromotive force will hereinafter be referred to as the "transformer effect." So long as the conducting material, whether it be solid or liquid, remains at rest, the only alternating electromotive force set up in its mass, is that due to said transformer effect. As soon, however, as the conducting material becomes endowed with motion having a component perpendicular to the direction of the field, there appears a further electromotive force, due to the hereinbefore discussed property of induction between a magnetic field and an electric conductor having relative motion. This electromotive force, hereinafter referred to as the "generator effect" will agree in frequency and phase position with the alternating magnetic field, and will have an intensity dependent upon the field strength and the velocity of the conducting material with respect to the field. While both electromotive forces are the outcome of that phenomenon known as electromagnetic induction, there will here be followed for purposes of clarity the practice common where electromotive forces are similarly associated, of referring to that developed by the transformer effect as "induced" and that by the generator effect as "generated." It is the latter of these whose value may be utilized in determining the velocity of flow, while the former is superfluous and must be eliminated from the measurement.

Actual tests upon this method of fluid flow determination, utilizing an alternating magnetic field, have shown that the transformer effect may be of such magnitude with respect to the desired generator effect as completely to swamp the latter, and render the resultant electromotive force quite unsuited for the purpose of flow determination. While in the practice of electrical measurement there are available methods for rendering the detecting instrument quantitatively responsive to alternating electromotive force of a single selected phase position, it has been found that attempts to apply such principles in the present instance result in the undesired transformer effect overloading the amplifying and detecting apparatus to an extent that the same is rendered undependable and inaccurate with respect to the desired, and relatively weak, generator effect. It therefore becomes necessary to devise means for substantially eliminating or materially minimizing the former effect before applying the available electromotive force to the measuring circuits.

It is an object of the present invention to provide a novel method of and apparatus for measuring fluid flow, inherently adapted to the determination of very small flow magnitudes in conducting or semi-conducting liquids.

It is a further object to provide a flow meter characterized by a high speed of response to changes in the value of the measured flow.

It is a further object to provide a flow meter having an inherently linear relationship between the rate of flow and the exhibited measurement.

It is a further object to provide a flow meter adapted to use with corrosive fluids.

It is a further object to provide a flow meter whose accuracy is inherently unaffected by changes in temperature, pressure, or chemical composition of the measured fluid.

It is a further object to provide a flow meter operating on the principle of electromagnetic induction, and in which spurious electromotive forces shall be inherently opposed and nullified, whereby only that electromotive force which is a function of the variable to be determined shall be effective for measurement.

In carrying out the purposes of the invention, it is proposed to provide an electrical flow meter having a conduit whereby the fluid whose rate of flow is to be determined may be passed through an alternating magnetic field to have generated therein an alternating electromotive force of magnitude dependent upon the rate of flow, and to associate with said conduit a chamber or cell or equivalent fluid-containing portion, likewise positioned in said alternating field, and adapted to have set up therein, and in opposition to similar effects in said conduit, electromotive forces due to all inductive effects between said field and said fluid, excepting those due to their relative motion.

In the drawings:

Fig. 1 is an isometric representation of a flow meter embodying the invention in an elementary form.

Fig. 2 is a side elevation, partly in section, of a portion of the device shown in Fig. 1.

Fig. 3 is an isometric representation of a flow meter embodying the principle of the invention in an alternative form.

Fig. 4 is an isometric representation of a device embodying the principle of the invention and adapted for insertion as an integral unit into a conduit carrying a fluid whose velocity is to be measured.

Fig. 5 is a view taken in section on a horizontal median plane of the device shown in Fig. 4.

Fig. 6 is an electrical diagram of a measuring instrument utilizing the principle of the invention.

Fig. 7 is a diagram of an alternative form of electrical circuit adapted to utilization of the principle of the invention.

Referring now to the drawings:

The numeral 8 in Figs. 1 and 2 designates a section of a conduit formed of non-magnetic, electrically insulating material, as, for example, a phenolic resin, adapted to carry a liquid whose velocity of flow is to be determined. At the location in the conduit where the measurement is to be performed, said conduit is provided with a T projection 9, extending perpendicularly to the axis of the conduit and communicating with the interior thereof. The junction of the conduit and T portions is preferably provided with a partition 10 (which may be integral with the wall of the conduit) said partition having therein a number of perforations 11, whereby the liquid within said conduit will also fill the T portion, but will have therein a negligible rate of flow. Disposed about the conduit section 8 and its T portion 9 is a magnetic circuit 12, preferably of laminated construction, and having opposed polar portions 13 and 14, providing an air gap wherein the magnetic flux developed in said magnetic structure will pass substantially uniformly through said T portion and across said conduit, whereby said T portion and conduit will be subjected to a common magnetic field. Carried by the magnetic structure 12 is an exciting winding 15 adapted to be energized from an alternating-current source, whereby to produce in said magnetic circuit and associated air gap an alternating field of corresponding frequency.

Laterally disposed upon the conduit portion 8 at the extremities of a diameter so located as to lie substantially upon the center line of the flux from the electromagnet, and substantially perpendicular to both said flux and the axis of said conduit, are electrodes 17 and 18, secured within the conduit walls and projecting therethrough in fluid-tight relationship and in a manner to provide for electrical connection between diametrically opposed points of the stream of contained fluid and an outside circuit. Similarly disposed upon diametrically opposed points of the T portion, and upon a line parallel to that connecting the electrodes 17 and 18 are further electrodes 19 and 20. The electrodes 18 and 20 are interconnected by a conductor 21, and the electrodes 17 and 19 are connected respectively to conductors 22 and 23. It will be understood that said electrodes will be either formed of, or plated with, material (presumably metallic) having a suitable electrical conductivity and selected from among those materials known to be immune to corrosion or other destructive effects due to contact with the particular liquid whose rate of flow is to be determined.

The operation of the apparatus set forth in Figs. 1 and 2 will be clear from consideration especially of Fig. 2. As previously explained, the portion of the conduit 8 shown toward the right of Fig. 2, and having a circular section, may be considered as filled with liquid flowing in a sense generally away from (or toward) the observer, while the liquid in the left hand portion 9 of the conduit will be substantially at rest, or at least will have no motion of translation such as characterizes that in the right hand portion. The alternating magnetic flux passing through the conduit structure and the body of liquid contained therein, between the polar portions 13 and 14, will follow a path generally indicated by the arrow A, and will alternate in its direction according to the excitation of the winding 15. The body of conducting liquid within the right hand portion 8 of the conduit, and flowing in a sense perpendicular to the direction of the magnetic flux, will, according to the well known principle of electromagnetic induction, have electromotive force set up therein, this electromotive force having a component perpendicular to both the direction of flux and the direction of flow, as indicated by the line C in Fig. 2, extending between the electrodes 17 and 18. There will thus be generated between said electrodes an electromotive force which will be a function of the rate of flow of liquid through the conduit portion 8.

Because of the alternating nature of the flux passing between the polar portions 13 and 14, there will also be set up in the conducting liquid contained within the conduit portion 8 certain electromotive forces due to the so-called "transformer effect"; these voltages or potential differences being independent of the rate of flow, and hence, in so far as the desired measurement is concerned, being spurious and undesirable components. By virtue of the electrodes 19 and 20 being positioned along a line (indicated by D in Fig. 2) which, so far as involves the magnetic flux and the distribution of the body of liquid, is symmetrical with the line C, it will be apparent that any electromotive forces set up between the electrodes 17 and 18 by the transformer effect, will be duplicated by electromotive forces set up between the electrodes 19 and 20 by the same effect. Thus, in the measurement of electromotive force between the conductors 22 and 23, connected to the electrodes 17 and 19 respectively, those potentials which are set up by the transformer effect in the two liquid portions of the electrical circuit will mutually annul, so that the resultant electromotive force appearing between said conductors will be solely that set up between the electrodes 17 and 18 due to the physical movement, or flow, of the liquid within the conduit portion 8 through the magnetic field traversing said conduit.

The measurement of the electromotive force appearing between the conductors 22 and 23 may be effected by any one of a number of well known methods, such, for example, as that shown in Fig. 6, which will hereinafter be explained in more detail.

In the form of the invention shown in Fig. 3, the section of conduit wherein the velocity of fluid flow is to be measured (hereinafter referred to as the "measuring cell") is more or less isolated from the section (hereinafter known as the "compensating cell"), in which compensation for spurious effects is obtained. The numeral 25 designates the section of conduit which constitutes the measuring cell, formed of suitable electrically insulating material; and, laterally spaced from the conduit section 25 and substantially parallel therewith, is a short section of conduit 26, closed at its ends, and placed in internal communication with the conduit section 25 by means of two cross pipes 27 and 28 located near the respective extremities of the conduit section 26, whereby to provide restricted communication between the two conduit sections, so that while in the section 26 there will exist no appreciable velocity of flow, there will be sufficient interchange of liquid with that in the main conduit 25 to assure substantially identical chemical and physical conditions therewith.

Positioned about said conduit sections 25 and 26 is a magnetic circuit having polar portions 30 and 31 so disposed as to provide an air gap in which said conduit sections may be symmetrically disposed, so that such magnetic flux as may traverse said gap will also traverse said conduit sections with substantially equal intensity and distribution in the two measuring cells. Uniformity of distribution and strength of magnetic field may be improved by the interposition of a core portion 32 between the two conduit sections. The magnetic system of which the polar portions 30 and 31 and the core portion 32 form parts is preferably of laminated construction similar to the structure 12 shown in Fig. 1, and is also adapted to be magnetized with an alternating flux by means of a winding not shown in the drawing. Penetrating the upper walls of the two cells 25 and 26 are electrodes 33 and 34 respectively, these being opposed by similar diametrically spaced electrodes on the lower sides of said cells, and not shown in the drawing. Said electrodes 33 and 34 have connected thereto conductors 35 and 36 respectively, and the electrodes on the lower portions of the cells are interconnected by means of a conductor 37. The general arrangement of cells and electrodes is similar to that shown in Fig. 2; and it will be obvious from an analysis of the principles involved that any electromotive force set up between the electrodes in the conduit portion 25, other than that due to motion of the contained liquid with respect to the magnetic field, will be balanced by an equal electromotive force similarly set up in the conduit portion 26, so that such electromotive force as appears between the conductors 35 and 36 in Fig. 3 will be similar to that appearing between conductors 22 and 23 in Fig. 2, and will be a function of the rate of flow of liquid through the measuring cell or conduit portion 25.

The form of the invention shown in Figs. 4 and 5 constitutes an integral unit or "probe" which may be positioned in a closed conduit or open flume in order to determine the rate of flow of a liquid therethrough. A laminated magnetic structure 40 comprises a central core 41 and two divergent return arms 42 and 43, having therein substantially identical air gaps, whereby magnetic flux due to a magnetomotive force established in the portion 41 will divide substantially equally between the two portions 42 and 43, giving corresponding total flux values in said two air gaps. The central core portion 41 carries a coil or winding 44 adapted for energization from an alternating current source, whereby to set up in the magnetic structure and alternating field as described.

Positioned in the air gap of the arm 42 is a measuring cell 46, comprising a block of suitable electrically insulating material, firmly secured to the magnetic structure, and having bore therethrough a cylindrical passage 47, preferably slightly flared at its extremities, whereby a mass of liquid impinging upon the end of said block will tend to flow smoothly through the passage 47 with a minimum of turbulence. Penetrating the side walls of the cell 46 are electrodes 48 and 49 disposed upon a diametrical line, perpendicularly both to the normal direction of the magnetic field traversing the cell and to the general direction of flow through the passage 47. To the electrodes 48 and 49 are attached conductors 50 and 51 respectively, whereby electrical connection may be made to an external circuit.

Positioned in the air gap of the arm 43 is a compensating cell 52, formed of insulating material, and structurally similar to the measuring cell 46 in all respects except that instead of having a passage corresponding to the passage 47 extending through its length, there is bored, or otherwise formed, in the material of the cell a recess 53 of the same diameter as the passage 47, but closed at one end, forming a deep cup or cavity, into which the liquid in which the element is immersed may enter freely, but with a negligible circulation due to the flow of said liquid with respect to the structure. The compensating cell 52 is provided with laterally disposed electrodes 54 and 55, similar in all respects to those forming parts of the cell 46, and having connected thereto conductors 56 and 57 respectively, by which electrical connection may be made to an external circuit.

A bracket or clamp member 58 is secured to the magnetic structure 40; and to said member may be connected a tubular support 59, adapted to be attached to the walls of a pipe or other conduit in which flow is to be determined, and in such a manner that the cell 46 will be toward the upstream extremity of the structure with the axis of the passage 47 substantially parallel to the line of fluid flow, and the recess 53 pointing downstream so as to be filled with fluid identical with that passing through the measuring cell, but substantially devoid of measurable flow. The bracket 58 may be made hollow, or otherwise provided with suitable openings or apertures, whereby the conductors 50, 51, 56 and 57, as well as the energizing leads for the exciting winding 44, may conveniently be carried to the interior of the tubular support 59, and thereby led to a convenient location for connection to external circuits. It will be understood that the winding 44 and all other parts normally susceptible to damage by moisture or by the corrosive action of such liquids as may be measured by the device, will be suitably impregnated, or otherwise treated in a manner to render them immune to such effects, and also that the conductors will be insulated in such a manner as to preclude the possibility of shunt circuits which might adversely affect the measurement. If desired, the structure may be mechanically shielded to provide protection from the liquid, and, if necessary, to impart to the assembly a "streamlined" conformation.

An elementary electric circuit by which the properties of the invention may be utilized is shown in Fig. 6, wherein said circuit is indicated in its application to the form of the invention illustrated in Fig. 3. The conductors 35 and 36, connected to electrodes in the walls or cells 25 and 26 respectively, are led to the input terminals of a suitable amplifier unit 61, whereby the electromotive force appearing between said conductors may be amplified to a value suitable for actuating a conventional measuring instrument. A voltmeter or equivalent instrument 62, connected to the output terminals of said amplifier, will respond quantitatively to said electromotive force; and since this voltage, as hereinbefore pointed out, is a function of the rate of flow of liquid through the measuring cell 25, and is free of spurious potentials due to induction, the instrument 62 may have its scale graduated in units representing said rate of flow and provide a direct measure of the required magnitude. If desired, an adjustable calibrating resistor 63 may be bridged between the conductors 35 and 36.

In Fig. 7 is shown an electrical system adapted to the purposes of the invention, incorporating the null principle of measurement, and embodying means whereby the electromotive forces of the measuring and compensating cells respectively may be mutually opposed, and the magnitude of the residual electromotive force determined to a high degree of precision. A selfbalancing instrument 65 includes an electrical network comprising two resistors 66 and 67 of fixed (and preferably equal) value, a manually adjustable slide-wire resistor 68, and a slide-wire resistor 69, the latter having associated therewith a movable contact 70 adapted to be translated along the extent of said slide wire by means of a lead screw 71 selectively rotatable in either direction by a reversible electric motor 72. Attached to the movable contact 70 is an index or pointer 73 adapted to cooperate with a graduated scale 74 fixed to the frame of the instrument 65, whereby to provide a measure of the translated position of said movable contact.

Included in said electrical network are the measuring and compensating cells respectively of any one of the structural embodiments of the invention as hereinbefore set forth. For example, as designated in Fig. 7, these are the cells 46 and 52 respectively of the form of the invention shown in Figs. 4 and 5, the conductors 51 and 57 being connected to a common terminal 75, and the conductors 50 and 56 to terminals 76 and 77 respectively. One end each of the resistors 66 and 67 is connected to a common terminal 78, the free end of the resistor 66 being connected in series with the slide-wire 68 to the terminal 77, and the free end of the resistor 67 in series with the adjustable resistor 69 to the terminal 76. Between the terminals 75 and 78 is connected an adjustable resistor 79. The magnetizing winding 44 is shown as energized from an alternating-current source 80. The relative polarity of the cells 46 and 52 is made such that the electromotive forces induced due to alternating fluxes therein will tend to be in opposition about the circuit formed by said cells and the four resistance units 69, 67, 66, and 68, and will act in parallel to cause a current to flow through the adjustable resistor 79, thereby providing a "load" upon said cells.

The motor 72 is preferably of the alternating-current two-phase induction type having a first winding 81 and a second winding 82 mutually displaced about the magnetic circuit of said motor and each adapted for energization from an A.-C. source. According to the well-known principle of motors of this class, the torque and direction of rotation will be dependent upon the magnitudes and phase-relationships of the alternating voltages impressed upon its respective windings.

The winding 81 of the motor 72 is directly connected to the alternating-current source 80. The winding 82 of said motor is connected to the output terminals of an amplifier 83, whose input terminals are connected between the movable contact 70 of the slide-wire 69 and the contact of the adjustable slide-wire resistor 68. Thus, a suitably amplified replica of the alternating voltage which may at any time exist between said contacts will be applied to the winding 82, with a consequent tendency to produce rotation of the motor 72. It will be understood that the amplifier unit 83 may incorporate in its structure and electric circuits those elements which may be necessary to produce between its input potential and that applied to the winding 82 such a time-phase displacement as will produce optimum operating conditions in the motor 72.

In operation, the winding 81 of the motor 72 and the magnetizing winding 44 are simultaneously energized from the alternating-current source 80. With identical conditions in the cells 46 and 52, as will be substantially the case when the liquid in both cells is at rest, the voltages induced therein will be equal, and said cells will act as two parallel sources of current flowing through the load resistor 79. With the movable contact 70 set at such a position that the pointer 73 indicates zero on the scale 74, the position of the contact member of the resistor 68 may be adjusted until the potential between the two contacts is zero, when the motor 72 will remain at rest. When motion is imparted to the fluid in the measuring cell 46, the "generator" effect will cause a further electromotive force to be developed between the electrodes of the cell, which will cause the current flowing in the branch of the circuit containing that cell to differ from that in the other branch, whereby a difference of potential will be developed between the contacts on the respective slide-wires, and impressed upon the amplifier unit 83. The output potential of said amplifier, being impressed upon the winding 82 of the motor 72, will cause the latter to operate; and by proper selection of relative polarities in the system, the rotation of the motor may be made such as at all times to tend to move the contact 70 to a position of equal potential with the contact on the resistor 68, thus re-establishing a condition of balance in the electrical network. As the current in the slide-wire 70 will be a function of both the rate of fluid flow in the cell 46 and the total resistance of the electrical circuit, adjustment of the resistor 75, through which the principal part of such current passes, may be utilized for calibration of the device, until the desired relationship is established between the rate of fluid flow through said cell and the graduations upon the scale 74.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. Apparatus for measuring the rate of flow of an electrically conducting fluid stream, said apparatus comprising means for passing an alternating magnetic field across a portion of said stream to develop therein an alternating electromotive force, means comprising electrical connections for opposing said electromotive force an electromotive force induced by said alternating field in a substantially stationary portion of said fluid, and means for measuring the resultant electromotive force.

2. In a device for determining the rate of flow of an electrically conducting fluid, means for causing a stream of said fluid to be transversed by an alternating magnetic field having a component perpendicular to the direction of flow of said fluid to have developed therein an electrical potential comprising two components, one induced by said alternating field without respect to the motion of said fluid, and one generated by the motion of said stream of fluid relative to the path of said field, a pair of electrodes adapted to contact with boundary portions of said stream on a line substantially perpendicular to both said field component and said flow direction, connections including said electrodes to provide an electrical circuit having a return portion lying in said magnetic field across a portion of the fluid devoid of motion corresponding to the flow to be measured to have induced therein by said alternating field an electromotive force equal to and opposite to said first-named induced component, whereby electromotive forces set up between said electrodes and in said return portion will mutually annul, except that due to the motion of said fluid with respect to said field, and means for measuring the residual electromotive force.

3. In a device for determining the rate of flow of an electrically conducting fluid, a conduit portion adapted to carry a moving stream of said fluid, means adapted to produce in said conduit portion an alternating magnetic field having a component perpendicular to the direction of flow, a pair of electrodes in the wall of said conduit portion and adapted to contact with boundary portions of said stream, reservoir means in communication with said conduit means to contain a portion of said fluid substantially devoid of motion corresponding to said flow, said reservoir means being traversed by said magnetic field, a pair of electrodes in the wall of said reservoir means and adapted to contact with boundary surfaces of the fluid contained therein, and electrical connections including all said electrodes for opposing the electromotive force induced in the fluid between said second-named pair of electrodes to that induced in the fluid between said first-named pair of electrodes, together with an instrument connected therein to measure the resultant of the electromotive forces simultaneously existing between the electrodes comprising said respective pairs.

4. In a device for determining the rate of flow of an electrically conducting fluid, means to cause an alternating magnetic field to traverse a moving portion of said fluid in a sense having a component perpendicular to the direction of motion, means to cause a similar field to traverse a substantially stationary portion of said fluid for inducing therein an electromotive force equal to the electromotive force component induced in the first-mentioned portion of the fluid irrespective of movement of said first-mentioned portion, electrodes adapted to contact with boundary surfaces of said fluid portions, means interconnecting said electrodes for opposing the electromotive forces induced in said fluid portions, and means for measuring the resultant alternating electromotive force existing in said interconnecting means.

5. In a device for determining the rate of flow of an electrically conducting fluid, means to cause an alternating magnetic field to traverse a moving portion of said fluid in a sense having a component perpendicular to the direction of motion, a pair of electrodes adapted to contact with boundary surfaces of said fluid portion, means to cause an alternating magnetic field similar to said first-named field to traverse a substantially stationary portion of said fluid for inducing therein an electromotive force equal to the electromotive force component induced in the first-mentioned portion of the fluid irrespective of movement of said first-mentioned portion, a pair of electrodes adapted to contact with boundary surfaces of said stationary fluid portion, means interconnecting said pairs of electrodes for opposing the electromotive forces induced in said fluid portions, and means for measuring the resultant of the electromotive forces existing between said respective pairs of electrodes.

6. In a device for determining the rate of flow of an electrically conducting fluid, a first cell adapted to transmit a stream of said fluid flowing at the rate to be measured, a pair of electrodes in the walls of said cell to contact boundary surfaces of said fluid and positioned on a line substantially normal to the direction of said fluid flow, a second cell adapted to contain a substantially stationary portion of said fluid, a pair of electrodes in the wall thereof to contact the boundary surfaces of said contained fluid, means for causing substantially identical alternating magnetic fields to traverse said cells with a component in said first cell normal to the direction of fluid flow, a circuit interconnecting said pairs of electrodes for opposing the electromotive forces induced in said cells, and instrument means for measuring the resultant alternating electromotive force in said circuit.

7. In a device for determining the rate of flow of an electrically conducting fluid, a first cell adapted to transmit a stream of said fluid flowing at the rate to be measured, a pair of electrodes in the walls of said cell to contact boundary surfaces of said fluid and positioned on a line substantially normal to the direction of said fluid flow, a second cell adapted to contain a substantially stationary portion of said fluid, a pair of electrodes in the wall thereof to contact the boundary surfaces of said contained fluid, means for causing substantially identical alternating magnetic fields to traverse said cells with a component in said first cell normal to the direction of said fluid flow, means comprising a bridge circuit including said respective pairs of electrodes in adjacent arms for opposing the electromotive forces induced between the electrodes of said pairs, displaceable means for balancing said bridge circuit to reduce to zero the alternating electromotive force between two selected points therein, and measuring means to determine the displacement of said balancing means.

8. In apparatus for determining the rate of flow of an electrically conducting fluid, means to cause an alternating magnetic field to traverse a moving portion of said fluid in a sense having a component perpendicular to the direction of motion, means to cause a similar field to traverse a stationary portion of said fluid, means comprising electrical connections for opposing the electromotive forces developed in said fluid portions, and means for measuring the resultant electromotive force.

9. In apparatus for determining the rate of flow of an electrically conducting fluid, a conduit portion adapted to carry a moving stream of said fluid, reservoir means in communication with said conduit portion to contain a portion of said fluid substantially devoid of motion corresponding to said flow, means for producing in said conduit portion and reservoir means an alternating magnetic field traversing the same and having a component perpendicular to the direction of flow in said conduit portion, a pair of electrodes in the wall of said conduit portion and adapted to contact with portions of said stream, and another pair of electrodes in the wall of said reservoir means and adapted to contact with portions of the fluid contained therein, said pairs of electrodes being connected in series opposition with respect to potentials induced in the fluid bodies between said respective pairs of electrodes by virtue of the alternating nature of said magnetic field.

10. A portable unit insertible into a flowing stream of electrically conducting fluid or measuring the rate of flow thereof, said unit comprising a cell providing for the flow of said fluid therethrough, a second cell adapted to contain a substantially stationary portion of said fluid, electrodes in the walls of said cells adapted to contact with the fluid therein, and means for causing substantially identical alternating magnetic fields to traverse said cells with a component in said first cell normal to the direction of said fluid flow therethrough, the electrodes of the respective cells being connected in series opposition with respect to potentials induced in the fluid in said cells by virtue of the alternating nature of said magnetic fields.

11. A portable unit insertible into a flowing stream of electrically conducting fluid for measuring the rate of flow thereof, said unit comprising a core of magnetic material, an arm of magnetic material extending laterally from one end to the other of said core, said arm having a cell therein adapted for the passage of said fluid therethrough, a second arm of magnetic material at the opposite side of said core and extending from one end to the other of said core, said second arm having therein a cell adapted to contain a substantially stationary portion of said fluid, electrodes in the walls of said cells, and a winding surrounding said core for causing substantially identical magnetic fluxes to traverse said cells with a component in said first cell normal to the direction of said fluid flow therethrough, the electrodes in said cells being connected in series opposition with respect to potentials induced in the fluid in said cells by virtue of the alternating character of said magnetic fluxes.

12. Apparatus for determining the rate of flow of an electrically conducting fluid stream, said apparatus comprising means for causing an alternating magnetic field to traverse a moving portion of said fluid in a sense having a component perpendicular to the direction of motion, means to cause a similar field to traverse a stationary portion of said fluid, and electrical connections adapted to oppose the electromotive forces developed in said fluid portions.

13. Apparatus for determining the rate of flow of an electrically conducting fluid stream, said apparatus comprising means for causing an alternating magnetic field to traverse a moving portion of said fluid in a sense having a component perpendicular to the direction of motion, and means comprising electrical connections adapted to deduct from the total electromotive force developed in said moving portion the electromotive force induced therein by the alternating character of said field as distinguished from that generated by the motion of said portion with respect to said field.

JOHN G. FLEMING.

REFERENCES CITED

The following references are of record in the file of this patent:

UNITED STATES PATENTS

| Number | Name | Date |
| --- | --- | --- |
| 2,149,847 | Kolin | Mar. 7, 1939 |
| 2,435,043 | Lehde et al. | Jan. 27, 1948 |

OTHER REFERENCES

Article by A. Kolin in "The Review of Scientific Instruments," vol. 16, No. 5, May 1945, pages 109–116.